(12) United States Patent
Din et al.

(10) Patent No.: US 9,094,104 B2
(45) Date of Patent: Jul. 28, 2015

(54) TRANSCEIVER FRONT-END

(75) Inventors: Imad Ud Din, Lund (SE); Stefan Andersson, Lund (SE); Daniel Eckerbert, Lund (SE); Henrik Sjöland, Löddeköpinge (SE); Tobias Tired, Lund (SE); Johan Wernehag, Malmö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 314 days.

(21) Appl. No.: 13/586,500

(22) Filed: Aug. 15, 2012

(65) Prior Publication Data

US 2014/0009245 A1   Jan. 9, 2014

(30) Foreign Application Priority Data

Jul. 9, 2012 (WO) .................. PCT/EP2012/063428

(51) Int. Cl.
*H03H 7/38* (2006.01)
*H04B 1/525* (2015.01)

(52) U.S. Cl.
CPC ........ *H04B 1/525* (2013.01); *H04B 2203/5491* (2013.01); *Y10T 29/49117* (2015.01)

(58) Field of Classification Search
CPC ............. H03H 7/46; H03H 7/38; H04B 1/38; H04B 1/525

USPC .......................................... 333/126–129, 132
See application file for complete search history.

(56) References Cited

U.S. PATENT DOCUMENTS

| | | |
|---|---|---|
| 2003/0128081 A1 | 7/2003 | Ella et al. |
| 2006/0135084 A1 | 6/2006 | Lee |
| 2008/0279262 A1 | 11/2008 | Shanjani |
| 2010/0109800 A1 | 5/2010 | Ueda et al. |
| 2011/0064004 A1 | 3/2011 | Mikhemar et al. |
| 2011/0299433 A1 | 12/2011 | Darabi et al. |
| 2013/0077540 A1 | 3/2013 | Black et al. |

*Primary Examiner* — Robert Pascal
*Assistant Examiner* — Kimberly Glenn
(74) *Attorney, Agent, or Firm* — Coats & Bennett, PLLC

(57) ABSTRACT

A transceiver front-end of a communication device comprises a frequency blocking arrangement, which may be either a transmit frequency blocking arrangement or a receive frequency blocking arrangement. The frequency blocking arrangement has a blocking frequency interval associated with one of a transmit frequency and receive frequency, and a non-blocking frequency interval associated with the other of the transmit frequency and receive frequency. The frequency blocking arrangement is configured to block passage of signals in the blocking frequency interval between said signal transmission and reception node and either said receiver node or said transmitter node. The frequency blocking arrangement comprises a network of passive components comprising at least one transformer and a filter arrangement adapted to have a higher impedance value in the blocking frequency interval than in the non-blocking frequency interval.

45 Claims, 7 Drawing Sheets

TRANSCEIVER FRONT-END

RELATED APPLICATION

This application claims the benefit under 35 U.S.C. §119 of International Application Number PCT/EP2012/063428 filed on Jul. 9, 2012, the disclosure of which is incorporated herein by reference.

TECHNICAL FILED

The present invention relates generally to the field of transceiver front-ends for communication devices. More particularly, it relates to transceiver front-ends providing isolation between a transmitter and a receiver.

BACKGROUND

In transceivers for frequency division duplex (FDD) communication (e.g., a transceiver of a cellular radio equipment), the receiver typically experiences strong interference signals from the transmitter of the same transceiver.

The interference signal from the transmitter has a carrier frequency at duplex distance from the carrier frequency of the receive signal. A typical duplex distance is small compared to the carrier frequencies. Typically, the duplex distance may be less than 100 MHz while the carrier frequencies may, for example, be somewhere between 700 MHz and 3 GHz.

To be able to operate with required performance (e.g., achieving good sensitivity), the receiver should preferably be shielded (or isolated) from the interference from the transmitter of the transceiver, both from transmitter signals at transmit frequency and transmitter generated interference at receive frequency. It is also desirable that the transmitter is shielded (or isolated) from the received signals. Example reasons include that as much of the received energy as possible should be transferred to the receiver for optimal receiver performance and that received signals occurring at the transmitter output may cause interference to the signal to be transmitted.

Such isolation is typically achieved by off-chip acoustic wave duplex filters (duplexers). A drawback with duplexers is that they are typically expensive. They are also bulky which increases the size of a transceiver implementation. Duplexers are also fixed in frequency, which necessitates several duplexers to be used if several frequency bands are to be supported. These problems are becoming more pronounced as the number of frequency bands to be supported by a communication device is increased.

Therefore, there is a need for integrated solutions that provide isolation between a transmitter and a receiver.

A typical on-chip isolation implementation is based on cancellation of the interferer signal. To achieve perfect cancellation of transmit signals at the receiver input symmetry is necessary, and the circuit requires a dummy load that equals the antenna impedance both at the receive frequency and at the transmit frequency. If the antenna impedance is complex (inductive or capacitive) and/or varies over time (e.g., due to frequency changes and/or changing antenna surroundings), implementation of a perfect cancellation becomes cumbersome. Furthermore, at least 3 dB of the power of receive and transmit signals will be lost in the dummy load.

US 2011/0064004 A1 discloses an radio frequency (RF) front-end comprising a power amplifier (PA), a noise-matched low-noise amplifier (LNA), a balance network, and a four-port isolation module. The isolation module isolates the third port from the fourth port to prevent strong outbound signals received at the third port from saturating the LNA coupled to the fourth port. Isolation is achieved via electrical balance.

Similarly as described above, a drawback of this solution is that the balance network needs to track impedance changes in the antenna during operation to enable sufficient isolation. The impedance needs to be tracked at both receive frequency and transmit frequency simultaneously. Thus, the implementation is sensitive and complex. A further drawback of this solution is that at least 3 dB of the power of receive and transmit signals will be lost due to the matched impedance of the balance network.

Therefore, there is a need for alternative and improved integrated solutions that provide isolation between a transmitter and a receiver.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved integrated solutions that provide isolation between a transmitter and a receiver.

According to a first aspect, this is achieved by a transceiver front-end of a communication device. The communication device may be a wireless or wired communication device.

According to the first aspect, the transceiver front-end is connectable, at a signal transmission and reception arrangement node, to a signal transmission and reception arrangement adapted to transmit a transmit signal having a transmit frequency and to receive a receive signal having a receive frequency. Examples of signal transmission and reception arrangements include an antenna, a group of antennas, and a cable.

The transceiver front-end is also connectable, at one or more transmitter nodes, to a transmitter adapted to produce the transmit signal, and, at one or more receiver nodes, to a receiver adapted to process the receive signal.

The transceiver front-end comprises one or both of a transmit frequency blocking arrangement and a receive frequency blocking arrangement.

If the transceiver front-end comprises a transmit frequency blocking arrangement it is connected to the signal transmission and reception arrangement node and at least one of the receiver nodes. The transmit frequency blocking arrangement has a blocking frequency interval associated with the transmit frequency and a non-blocking frequency interval associated with the receive frequency, and is adapted to block passage of transmit frequency signals between the signal transmission and reception arrangement and the receiver. The transmit frequency may be comprised in the blocking frequency interval and the receive frequency may be comprised in the non-blocking frequency interval.

If the transceiver front-end comprises a receive frequency blocking arrangement it is connected to the signal transmission and reception arrangement node and at least one of the transmitter nodes. The receive frequency blocking arrangement has a blocking frequency interval associated with the receive frequency and a non-blocking frequency interval associated with the transmit frequency, and is adapted to block passage of receive frequency signals between the signal transmission and reception arrangement and the transmitter. The receive frequency may be comprised in the blocking frequency interval and the transmit frequency may be comprised in the non-blocking frequency interval.

Thus, the transmitter is connectable to the signal transmission and reception arrangement node via the receive frequency blocking arrangement and the receiver is connectable to the signal transmission and reception arrangement node via the transmit frequency blocking arrangement.

At least one of the transmit frequency blocking arrangement and the receive frequency blocking arrangement comprises a network of passive components comprising at least one transformer and a filter arrangement adapted to have a higher impedance value in the blocking frequency interval than in the non-blocking frequency interval.

In some embodiments, both of the transmit frequency blocking arrangement and the receive frequency blocking arrangement comprise a network of passive components and a filter arrangement. In other embodiments, one of the transmit frequency blocking arrangement and the receive frequency blocking arrangement comprises another structure, which may, for example, be comprised in the transceiver front-end or implemented as a separate module. Examples of other structures include a capacitance-inductance network, and an arrangement with a bank of surface acoustic wave (SAW) filters and an antenna switch. Other examples of structures include an arrangement with a network of passive components and a frequency translated impedance.

In some embodiments, the filter arrangement comprises a first inductance connected in parallel with a first capacitance to form a blocking frequency resonance arrangement.

The first inductance may be a part of the transformer according to some embodiments. In other embodiments, the first inductance comprises a separate inductance.

The filter arrangement may further comprise at least one of a second inductance and a second capacitance connected in series with the blocking frequency resonance arrangement to form a non-blocking frequency resonance arrangement.

If the filter arrangement is a low pass filter arrangement, the filter arrangement may comprise the second capacitance. If the filter arrangement is a high pass filter arrangement, the filter arrangement may comprise the second inductance. In some embodiments, a filter arrangement does not necessarily comprise any of the second inductance and the second capacitance as will be explained later.

The filter arrangement of the receive frequency blocking arrangement may be adapted to have a higher impedance value at the receive frequency than at the transmit frequency (i.e., having a blocking frequency associated with the receive frequency and a non-blocking frequency associated with the transmit frequency). The filter arrangement of the transmit frequency blocking arrangement may be adapted to have a higher impedance value at the transmit frequency than at the receive frequency (i.e., having a blocking frequency associated with the transmit frequency and a non-blocking frequency associated with the receive frequency).

According to some embodiments, the signal transmission and reception arrangement node is connected to a first node of a first side of the transformer of the receive frequency blocking arrangement, the first filter arrangement of the receive frequency blocking arrangement is connected to a second node of the first side of the transformer of the receive frequency blocking arrangement, and a first one of the transmitter nodes is connected to a first node of the second side of the transformer of the receive frequency blocking arrangement.

The receive frequency blocking arrangement may further comprise a second filter arrangement connected to a second node of the second side of the transformer of the receive frequency blocking arrangement according to some embodiments. Alternatively, the second node of the second side of the transformer of the receive frequency blocking arrangement may be connected to a second node of the one or more transmitter nodes.

According to some embodiments, the signal transmission and reception arrangement node is connected to a first node of a first side of the transformer of the transmit frequency blocking arrangement, the first filter is connected to a second node of the first side of the transformer of the transmit frequency blocking arrangement, and a first node of the one or more receiver nodes is connected to a first node of the second side of the transformer of the transmit frequency blocking arrangement.

The transmit frequency blocking arrangement may further comprise a second filter arrangement connected to the first node of the second side of the transformer of the transmit frequency blocking arrangement according to some embodiments. Alternatively, the second node of the second side of the transformer of the transmit frequency blocking arrangement may be connected to a second node of the one or more receiver nodes.

In some embodiments, the network of passive components further comprises a coupler connected between the first node of the first side of the transformer and the first node of the second side of the transformer and is adapted to cancel a remaining signal at the blocking frequency interval.

The coupler may comprise one or more resistances connected between the first node of the first side of the transformer and the first node of the second side of the transformer. For example, the coupler may comprise first and second resistances connected in series between the first node of the first side of the transformer and the first node of the second side of the transformer via a mid point node. The coupler may also comprise a third capacitance connected between the mid point node and ground. The first and second resistances may or may not be matched. In some embodiments, the coupler comprises a third inductance connected between the mid point node and ground (e.g., in parallel with the third capacitance if present). The third capacitance and the third inductance provides for a possibility to tune the phase of the coupling between the transformer sides so that the remaining signal is properly canceled.

To enable the coupler to cancel the remaining signal the first side of the transformer may be adapted to have an opposite phase compared to the second side of the transformer.

According to some embodiments, the transmit frequency blocking arrangement comprises first and second transformers. In some embodiments, the network of passive components comprises separate first and second transformers. In other embodiments, the network of passive components may comprise a single transformer unit and the first and second transformers are first and second parts of the single transformer unit.

In some embodiments, the transceiver comprises a transmit frequency arrangement including first and second transformers, and first, second, and third filter arrangements. The signal transmission and reception arrangement node may be connected to a first node of a first side of the first transformer, a first node of the one or more receiver nodes may be connected to a first node of a second side of the first transformer and a second node of the first side of the first transformer may be connected to a first node of a first side of the second transformer. The first filter arrangement may be connected to a second node of the first side of the second transformer. A second node of the second side of the first transformer may be connected to the second filter arrangement, a first node of a second side of the second transformer may be connected to the third filter arrangement, and a second node of the second side of the second transformer may be connected to a second node of the one or more receiver nodes.

In some embodiments, a filter arrangement, adapted to have a higher impedance value at the receive frequency than at the transmit frequency, may be connected between the first and second nodes of the one or more receiver nodes.

A second aspect is a transceiver comprising the transceiver front-end of the first aspect, the transmitter and the receiver. The transceiver comprises a transmit frequency blocking arrangement, a receive frequency blocking arrangement, or both. In some embodiments, one of the frequency blocking arrangements may comprise one or more separate components (if the transceiver front-end only comprises one of them). The transceiver may further comprise the signal transmission and reception arrangement.

A third aspect is a (wireless or wired) communication device comprising the transceiver of the second aspect.

According to a fourth aspect, a method is provided of blocking transmit frequency signals from passage between a signal transmission and reception arrangement and a receiver of a communication device. The method comprises constructing a filter arrangement comprising a first inductance connected in parallel with a first capacitance to form a blocking frequency resonance arrangement, and at least one of a second inductance and a second capacitance connected in series with the blocking frequency resonance arrangement to form a non-blocking frequency resonance arrangement, wherein the filter arrangement has a higher impedance value at the transmit frequency than at the receive frequency. The method further comprises connecting the signal transmission and reception arrangement to a first node of a first side of a transformer and the receiver to a first node of a second side of the transformer, and connecting the filter arrangement to a second node of the first side of the transformer.

According to a fifth aspect, a method is provided of blocking receive frequency signals from passage between a signal transmission and reception arrangement and a transmitter of a communication device. The method comprises constructing a filter arrangement comprising a first inductance connected in parallel with a first capacitance to form a blocking frequency resonance arrangement, and at least one of a second inductance and a second capacitance connected in series with the blocking frequency resonance arrangement to form a non-blocking frequency resonance arrangement, wherein the filter arrangement has a higher impedance value at the receive frequency than at the transmit frequency. The method further comprises connecting the signal transmission and reception arrangement to a first node of a first side of a transformer and the transmitter to a first node of a second side of the transformer, and connecting the filter arrangement to a second node of the first side of the transformer.

In some embodiments, the second, third, fourth and fifth aspects may additionally have features identical with or corresponding to any of the various features as explained above for the first aspect.

An advantage of some embodiments is that a possibility to implement an integrated solution for isolation between a transmitter and a receiver is provided.

Another advantage of some embodiments is that power loss due to a dummy load is avoided. Some embodiments provide a solution that is insensitive to antenna impedance variations.

A further advantage with some embodiments is that matching of a dummy load to antenna impedance is avoided.

Yet a further advantage with some embodiments is that tracking of changing antenna impedance is not necessary.

Some embodiments provide solutions for isolation between a transmitter and a receiver that are simple and area efficient (e.g., two transformers and two or more filter arrangements). Furthermore, the solutions according to some embodiments provide isolation while having low power consumption.

The isolation solutions provided by some embodiments are easily tunable due to the variable filter arrangements. In some embodiments, the tuning is achieved by variable capacitors of the filter arrangements.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
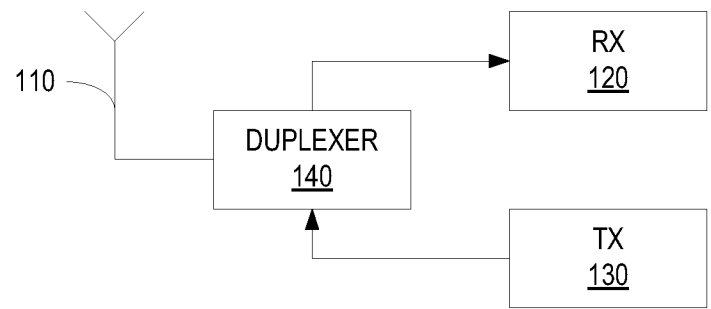
FIG. 1 is a schematic drawing illustrating a prior art transceiver arrangement.

In the following, embodiments will be described where transceiver structures are provided comprising a receiver, a transmitter, a signal transmission and reception arrangement (e.g., an antenna), a transmit frequency blocking arrangement and a receive frequency blocking arrangement.

The transmitter is connectable to the signal transmission and reception arrangement node via the receive frequency blocking arrangement and the receiver is connectable to the signal transmission and reception arrangement node via the transmit frequency blocking arrangement.

The transmit frequency blocking arrangement is adapted to block passage of transmit frequency signals between the signal transmission and reception arrangement and the receiver.

Blocking of transmit frequency signals may be achieved by the transmit frequency blocking arrangement having a blocking frequency interval associated with the transmit frequency and a non-blocking frequency interval associated with the receive frequency. The blocking frequency interval may be a frequency interval comprising the transmit frequency and the non-blocking frequency interval may be a frequency interval comprising the receive frequency. The frequency intervals may, for example, be broad band or narrow band. The frequency intervals may, for example, comprise all frequencies below a cut-off frequency or all frequencies of interest above a cut-off frequency. Typically, one of the frequency intervals is a low frequency interval and the other frequency interval is a high frequency interval.

Similarly, the receive frequency blocking arrangement is adapted to block passage of receive frequency signals between the signal transmission and reception arrangement and the transmitter.

Blocking of receive frequency signals may be achieved by the receive frequency blocking arrangement having a blocking frequency interval associated with the receive frequency and a non-blocking frequency interval associated with the transmit frequency. The blocking frequency interval may be a frequency interval comprising the receive frequency and the non-blocking frequency interval may be a frequency interval comprising the transmit frequency. The frequency intervals may, for example, be broad band or narrow band. The frequency intervals may, for example, comprise all frequencies below a cut-off frequency or all frequencies of interest above a cut-off frequency. Typically, one of the frequency intervals (opposite to the choice for transmit frequency blocking) is a low frequency interval and the other frequency interval is a high frequency interval.

Embodiments described herein provide an isolator/duplexer between a transmitter and a receiver. The isolator comprises the transmit frequency blocking arrangement and the receive frequency blocking arrangement.

Embodiments presented herein have one or more blocking arrangements comprising at least one transformer with one or more filter arrangements at the ground terminal(s). The transformer(s) may or may not have a cancellation path between the primary and secondary windings. Such a transformer arrangement can pass a signal at a frequency where the filter arrangement is low ohmic and attenuate a signal at another frequency where the filter arrangement is high ohmic.

Thus, at least one of the blocking arrangements comprises one or more filter arrangements. The filter arrangements are constructed to have pass (non-blocking) and blocking frequency ranges associated with the receive frequency or the transmit frequencies respectively. Each filter arrangement is typically a low pass filter arrangement or a high pass filter arrangement, where the respective cut-off frequency has a value between the receive frequency and the transmit frequency.

The filter arrangements (and thereby the isolator) are tunable by way of variable component values. The possibility to tune the filter arrangements to any desirable frequency provides for a possibility to have an integrated (on-chip) implementation of narrowband (high Q-value) filters, and a single (or very few) implementation may suffice for covering all relevant frequencies.

Even though many embodiments herein are particularly suitable for integrated implementation, the isolator may equivalently be implemented—partly or fully—off-chip (e.g., using discrete components).

FIG. 1 illustrates a typical transceiver arrangement according to the prior art. The typical transceiver comprises a receiver (RX) 120, a transmitter (TX) 130, an antenna 110 and a duplexer 140 implemented as a separate module. The duplexer provides isolation between the transmitter and the receiver. As mentioned before, such a duplexer implementation is typically expensive and large.

Figure 2:
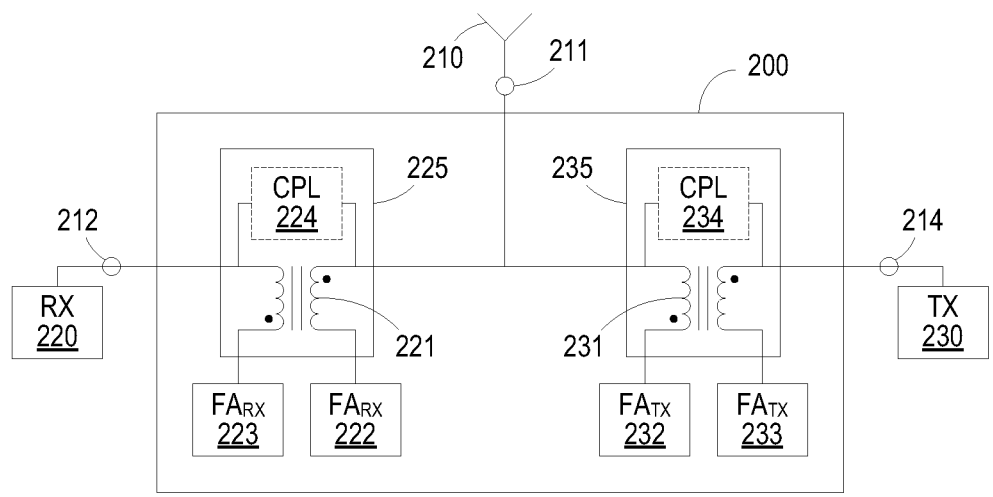
FIG. 2 is a schematic drawing illustrating an example transceiver arrangement according to some embodiments.

FIG. 2 illustrates an example of an alternative transceiver arrangement according to some embodiments. The transceiver arrangement of FIG. 2 comprises a receiver (RX) 220, a transmitter (TX) 230, an antenna 210 and a transceiver front-end 200. The antenna is connected to an antenna node 211 of the transceiver front-end, the transmitter is connected to a transmitter node 214 of the transceiver front-end, and the receiver is connected to a receiver node 212 of the transceiver front-end. In some embodiments, the transmitter and/or the receiver may be connected to two nodes of the transceiver front-end (i.e., differential receiver input and/or differential transmitter output).

The transceiver front-end 200 comprises a transmit frequency blocking arrangement and a receive frequency blocking arrangement.

The transmit frequency blocking arrangement comprises a network of passive components 225 comprising at least one transformer 221. In this example, the network of passive components may consist of the transformer 221 only, or of the transformer 221 and a coupler (CPL) 224 connected between the first and second side of the transformer. The first and second side of the transformer may have opposite phase as illustrated in FIG. 2 or they may have the same phase. In other examples, more components may be present.

The transmit frequency blocking arrangement also comprises at least one filter arrangement (FARX) 222, 223 adapted to have a higher impedance value in a transmit frequency blocking interval (e.g., a frequency interval comprising the transmit frequency) than in a receive frequency non-blocking interval (e.g., a frequency interval comprising the receive frequency). The filter arrangements (FARX) 222, 223 may be a low pass filter arrangement if the receive frequency is lower than the transmit frequency and may be a high pass filter arrangement otherwise.

The receive frequency blocking arrangement comprises a network of passive components 235 comprising at least one transformer 231. In this example, the network of passive components may consist of the transformer 231 only, or of the transformer 231 and a coupler (CPL) 234 connected between the first and second side of the transformer. The first and second side of the transformer may have opposite phase as illustrated in FIG. 2 or they may have the same phase. In other examples, more components may be present in a similar manner as described above for the transmit frequency blocking arrangement.

The function of the couplers 224, 234 is to cancel remaining signals at the unwanted frequency (i.e., signals not fully cancelled by the filter arrangements, for example due to tuning problems). The couplers 224, 234 will be further described later in connection to FIG. 11.

The receive frequency blocking arrangement also comprises at least one filter arrangement (FATX) 232, 233 adapted to have a higher impedance value in a receive frequency blocking interval (e.g., a frequency interval comprising the receive frequency) than in a transmit frequency non-blocking interval (e.g., a frequency interval comprising the transmit frequency). The filter arrangements (FATX) 232, 233 may be a high pass filter arrangement if the receive frequency is lower than the transmit frequency and may be a low pass filter arrangement otherwise.

Typically, a high impedance value may comprise a value that is higher than the antenna impedance.

The signal transmission and reception arrangement node 211 is connected to a first node of a first side of the transformer 221 of the transmit frequency blocking arrangement and to a first node of a first side of the transformer 231 of the receive frequency blocking arrangement.

The filter arrangements 222 and 232 are connected to a second node of the first side of the respective transformer 221, 231, the filter arrangements 223 and 233 are connected to a second node of the second side of the respective transformer 221, 231. Various implementations may employ one or more of the FAs 222, 223 and one or more of the FAs 232, 233. In the example shown in FIG. 2, the FAs 223, 233 connected to the second node of the second side of the respective transformer may be designed to be identical to the respective FA 222, 232 connected to the second node of the first side of the respective transformer. Alternatively, they may be tuned differently to compensate for imperfections, e.g., in the transformer.

The transmitter node 214 is connected to the first node of the second side of the transformer of the receive frequency blocking arrangement, and the receiver node 212 is connected to the first node of the second side of the transformer of the transmit frequency blocking arrangement.

As mentioned before the transmitter and/or the receiver may have a differential structure. Then, a second receiver node is connected to the second node of the second side of the transformer of the transmit frequency blocking arrangement and a second transmitter node is connected to the second node of the second side of the transformer of the receive frequency blocking arrangement.

Figure 3A:
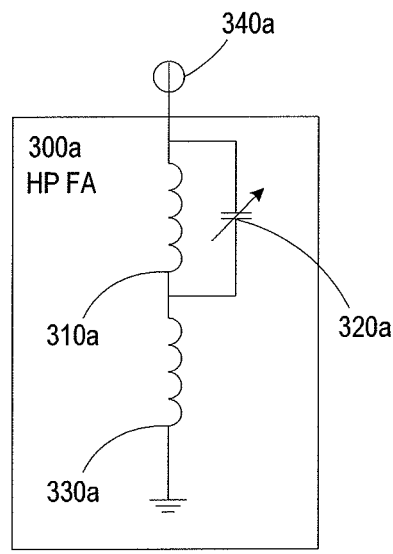
FIGS. 3a and 3b are schematic drawings illustrating two different examples of filter arrangements according to some embodiments.
Figure 3B:
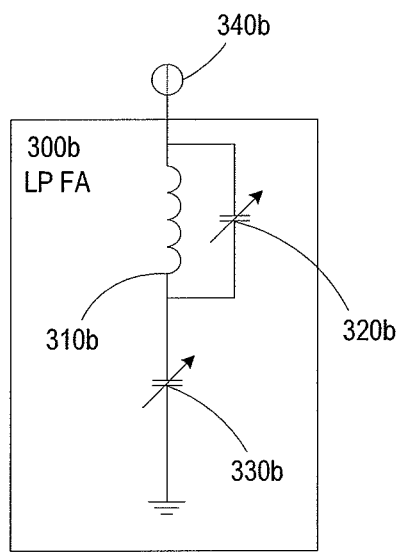

FIGS. 3a and 3b illustrate two examples of filter arrangements according to some embodiments. FIG. 3a illustrates a high pass filter arrangement (HP FA) 300a and FIG. 3b illustrates a low pass filter arrangement (LP FA) 300b.

In this context, the term high pass filter includes the case where the filter impedance characteristic has a peak at a first frequency and a notch at a second frequency (where the second frequency is higher than the first frequency), and the term low pass filter includes the case where the filter impedance characteristic has a notch at a first frequency and a peak at a second frequency (where the second frequency is higher than the first frequency).

In this example, the FA 300a comprises a connection node 340a, a first inductance 310a and a first capacitance 320a connected in parallel to the connection node 340a, and forming a blocking frequency resonance arrangement. The FA 300a also comprises a second inductance 330a connected in series with the parallel arrangement to ground, and forming a non-blocking (pass) frequency resonance arrangement with the first capacitance. The pass frequency range of the FA 300a (i.e., where the impedance of the FA is low) comprises frequencies above a cut-off frequency and the blocking frequency range of the FA 300a (i.e., where the impedance of the FA is high) comprises frequencies below the cut-off frequency. Typically the FA 300a may be constructed and tuned so that the cut-off frequency is between the transmit frequency and the receive frequency.

The example FA 300b comprises a connection node 340a, a first inductance 310a and a first capacitance 320a connected in parallel to the connection node 340a, and forming a blocking frequency resonance arrangement. The FA 300b also comprises a second capacitance 330b connected in series with the parallel arrangement to ground, and forming a non-blocking (pass) frequency resonance arrangement with the first inductance. The pass frequency range of the FA 300b (i.e., where the impedance of the FA is low) comprises frequencies below a cut-off frequency and the blocking frequency range of the FA 300b (i.e., where the impedance of the FA is high) comprises frequencies above the cut-off frequency. Typically the FA 300b may be constructed and tuned so that the cut-off frequency is between the transmit frequency and the receive frequency.

Each of the capacitors 320a, 320b, 330b can for example be selected to comprise one capacitance with a high value providing for a possibility to tune the filter arrangement to a frequency range (e.g., the filter bandwidth) of the filter arrangement and one capacitance with a low value providing for a possibility to tune the filter arrangement to a frequency band of interest. The capacitor may additionally comprise a bank of smaller capacitances to provide coverage of the full bandwidth of each frequency bands.

The capacitor 320a may typically be tuned to form a blocking frequency resonance arrangement with the inductance 310a and to form a non-blocking frequency resonance arrangement with the inductance 330a. The capacitor 320b may typically be tuned to form a blocking frequency resonance arrangement with the inductance 310b and the capacitance 330b may typically be tuned to form a non-blocking frequency resonance arrangement with the inductance 310b.

The filter arrangements may, for example, be implemented on chip, on high-Q substrate or as discrete components on a printed circuit board (PCB).

Returning to FIG. 2 and assuming that the receive frequency is higher than the transmit frequency, a HP FA construction (e.g., 300a) may be used for the FARX 222 and 223 and a LP FA construction (e.g., 300b) may be used for the FATX 232 and 233.

At transmit frequency, the FARX 222 and 223 have high impedance. Thus, no (or very limited) transmit frequency current will flow in the transformer 221, and the receiver is isolated from transmit signal leakage from the transmitter and/or the antenna. At receive frequency though, the FARX 222 and 223 have low impedance. Thus, receive frequency current will flow freely in the transformer 221, and the received signal is transformed to the receiver from the antenna.

At receive frequency, the FATX 232 and 233 have high impedance. Thus, no (or very limited) receive frequency current will flow in the transformer 231, and the transmitter is isolated from received signal leakage from the antenna. Likewise, receive frequency interference generated by the transmitter will not be transformed by the transformer 231. At transmit frequency though, the FATX 232 and 233 have low impedance. Thus, transmit frequency current will flow freely in the transformer 231, and the transmit signal is transformed to the antenna from the transmitter.

Looking into the circuit from the antenna node 211, the impedance at transmit frequency is low on the transmitter side and the transmitter transformer 231 is coupling transmit frequency signals from the transmitter to the antenna. On the other hand, looking into the circuit from the antenna node 211, the impedance at receive frequency is low on the receiver side and the receiver transformer 221 is coupling receive frequency signals from the antenna to the receiver.

In some embodiments, the second inductance 330a of the filter arrangement in FIG. 3a may be removed. For example, if two similar filter arrangements are located at respective sides of a transformer and there exists at least a small coupling between their first inductances, the second inductances may be omitted.

In some embodiments, the first inductance 310a, 310b of the filter arrangements in FIGS. 3a and 3b may be achieved by (partly or fully) utilizing the transformer windings or by letting a coupling (mutual inductance) between the first inductances of the filter arrangements comprise part of the transformer. The latter is an alternative way to implement the coupler function.

Figure 4:
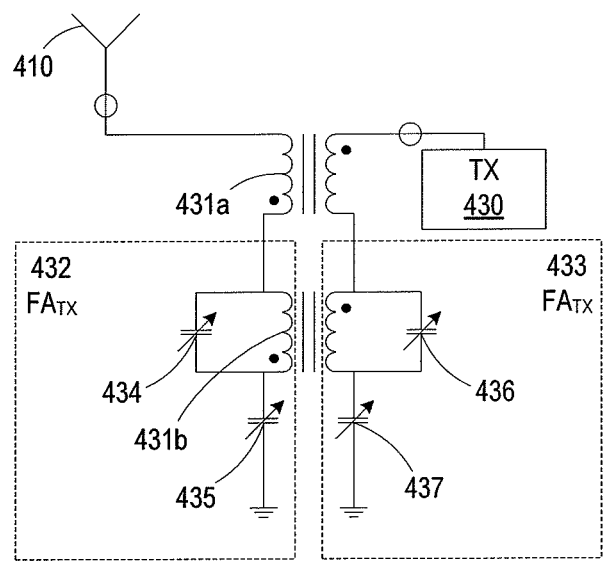
FIG. 4 is a schematic drawing illustrating an example receive frequency blocking arrangement according to some embodiments.

FIG. 4 illustrates such an example in a receive frequency blocking arrangement according to some embodiments. The arrangement of FIG. 4 comprises a transmitter (TX) 430, an antenna 410 and a receive frequency blocking arrangement.

The receive frequency blocking arrangement comprises a transformer having a first part 431a and a second part 431b. The first and second parts may be implemented as a single transformer or the second part may comprise two separate inductances experiencing a coupling (mutual inductance).

The first and second side of the transformer may have opposite phase as illustrated in FIG. 4 or they may have the same phase.

The signal transmission and reception arrangement 410 is connected to a first node of a first side of the first part 431a of the transformer. The transmitter 430 is connected to a first node of the second side of the first part 431a of the transformer. The second nodes of the first part 431a of the transformer are connected to respective first nodes of the second part 431b of the transformer.

The transmit frequency blocking arrangement also comprises two filter arrangements (FATX) 432, 433, each with a similar structure as described in connection with FIG. 3b (i.e., first 434, 436 and second 435, 437 capacitances and first inductances). The first inductances of the filter arrangements consist of respective windings of the second part 431b of the transformer.

If the coupling of the second part of the transformer should be stronger than needed for sufficient cancellation of the remaining unwanted signal, it is possible to restore isolation by fine-tuning the second capacitances 435, 437 in opposite directions.

A similar construction as shown in FIG. 4 (i.e., using a mutual inductance between the first inductances) is possible using a FA structure as described in connection with FIG. 3a when applicable. If the coupling of the second part of the transformer should be stronger than needed for sufficient cancellation of the remaining unwanted signal in that case, it is possible to restore isolation by fine-tuning the first capacitances in opposite directions.

Naturally, the similar constructions as the ones described in connection to FIG. 4 for a receive frequency blocking arrangement may be equally applicable in a transmit frequency blocking arrangement.

Figure 5:
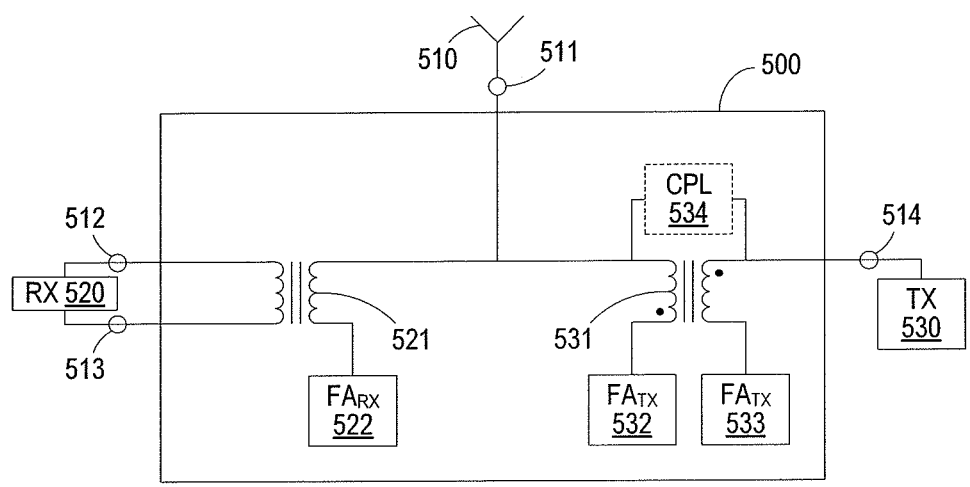
FIGS. 5-10 are schematic drawings illustrating example transceiver arrangements according to some embodiments.

FIG. 5 illustrates an example of an alternative transceiver arrangement according to some embodiments. The transceiver arrangement of FIG. 5 comprises a receiver (RX) 520, a transmitter (TX) 530, an antenna 510 and a transceiver front-end 500. The antenna is connected to an antenna node 511 of the transceiver front-end, the transmitter is connected to a transmitter node 514 of the transceiver front-end, and the receiver is connected to two receiver nodes 512, 513 of the transceiver front-end (i.e., the receiver has differential input). In some embodiments, the transmitter may be connected to two nodes of the transceiver front-end (i.e., differential transmitter output) and/or the receiver may have a non-differential (single-ended) input.

The transceiver front-end 500 comprises a transmit frequency blocking arrangement and a receive frequency blocking arrangement.

The transmit frequency blocking arrangement comprises a transformer 521. In this example, the first and second sides of the transformer 521 have the same phase and no coupler is present.

The transmit frequency blocking arrangement also comprises a filter arrangement (FARX) 522 adapted to have a higher impedance value in a transmit frequency blocking interval (e.g., a frequency interval comprising the transmit frequency) than in a receive frequency non-blocking interval (e.g., a frequency interval comprising the receive frequency). The filter arrangement 522 may be a low pass filter arrangement if the receive frequency is lower than the transmit frequency and may be a high pass filter arrangement otherwise.

The receive frequency blocking arrangement comprises a transformer 531 and (optionally) a coupler (CPL) 534 connected between the first and second side of the transformer. The first and second sides of the transformer have opposite phase which is a prerequisite for the coupler function.

The receive frequency blocking arrangement also comprises two filter arrangements (FATX) 532, 533 adapted to have a higher impedance value in a receive frequency blocking interval (e.g., a frequency interval comprising the receive frequency) than in a transmit frequency non-blocking interval (e.g., a frequency interval comprising the transmit frequency). The filter arrangements 532, 533 may be high pass filter arrangements if the receive frequency is lower than the transmit frequency and may be low pass filter arrangements otherwise.

The signal transmission and reception arrangement node 511 is connected to a first node of a first side of the transformer 521 of the transmit frequency blocking arrangement and to a first node of a first side of the transformer 531 of the receive frequency blocking arrangement.

The filter arrangement 522 is connected to a second node of the first side of the transformer 521, and the filter arrangement 532 and 533 are connected to a second node of the first and second side respectively of the transformer 531.

The transmitter node 514 is connected to the first node of the second side of the transformer of the receive frequency blocking arrangement, and the receiver nodes 512, 513 are connected to the first and second nodes respectively of the second side of the transformer of the transmit frequency blocking arrangement.

Figure 6:
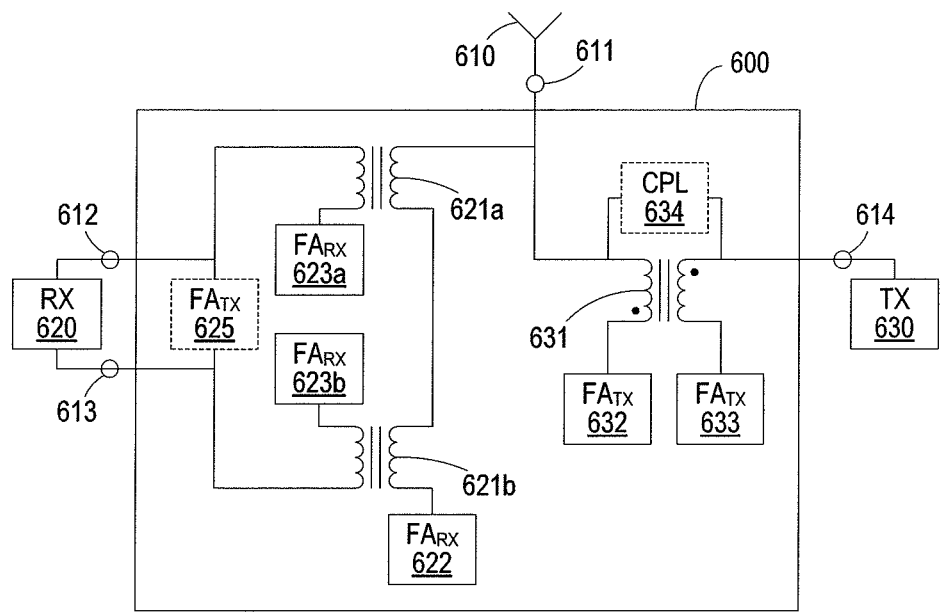

FIG. 6 illustrates yet an example of an alternative transceiver arrangement according to some embodiments. The transceiver arrangement of FIG. 6 comprises a receiver (RX) 620, a transmitter (TX) 630, an antenna 610 and a transceiver front-end 600. The antenna is connected to an antenna node 611 of the transceiver front-end, the transmitter is connected to a transmitter node 614 of the transceiver front-end, and the receiver is connected to two receiver nodes 612, 613 of the transceiver front-end (i.e., the receiver has differential input).

The transceiver front-end 600 comprises a transmit frequency blocking arrangement and a receive frequency blocking arrangement.

The receive frequency blocking arrangement comprises a transformer 631 and (optionally) a coupler (CPL) 634. The receive frequency blocking arrangement also comprises two filter arrangements (FATX) 632, 633. The receive frequency blocking arrangement is similar to the receive frequency blocking arrangement of FIG. 5 and will not be described in detail.

The transmit frequency blocking arrangement comprises first and second transformers 621a and 621b respectively. In this example, the first and second sides of the transformers have the same phase and no coupler is present.

The transmit frequency blocking arrangement also comprises a filter arrangement (FARX) 622 adapted to have a higher impedance value in a transmit frequency blocking interval (e.g., a frequency interval comprising the transmit frequency) than in a receive frequency non-blocking interval (e.g., a frequency interval comprising the receive frequency). The filter arrangement 622 may be a low pass filter arrangement if the receive frequency is lower than the transmit frequency and may be a high pass filter arrangement otherwise.

The signal transmission and reception arrangement node 611 is connected to a first node of a first side of the first transformer 621a of the transmit frequency blocking arrangement. The second node of the first side of the first transformer 621a is connected to the first node of the first side of the second transformer 621b. The filter arrangement 622 is connected to a second node of the first side of the second transformer 621b.

The receiver nodes 612, 613 are respectively connected to the first node of the second side of the first transformer and the second node of the second side of the second transformer.

The transmit frequency blocking arrangement also comprises two other filter arrangements (FARX) 623a, 623b adapted to have a higher impedance value in a transmit frequency blocking interval than in a receive frequency non-blocking interval. They are respectively connected to the second node of the second side of the first transformer and the first node of the second side of the second transformer.

Optionally, the transmit frequency blocking arrangement may also comprise a filter arrangement (FATX) 625 adapted to have a lower impedance value in a transmit frequency interval than in a receive frequency interval. It may be connected between the first node of the second side of the first transformer and the second node of the second side of the second transformer. The optional filter arrangement 625 provide for a further reduction of the transmit frequency signals at the receiver input. A drawback is that an insertion loss for receive frequency signals will be experienced.

Figure 7:
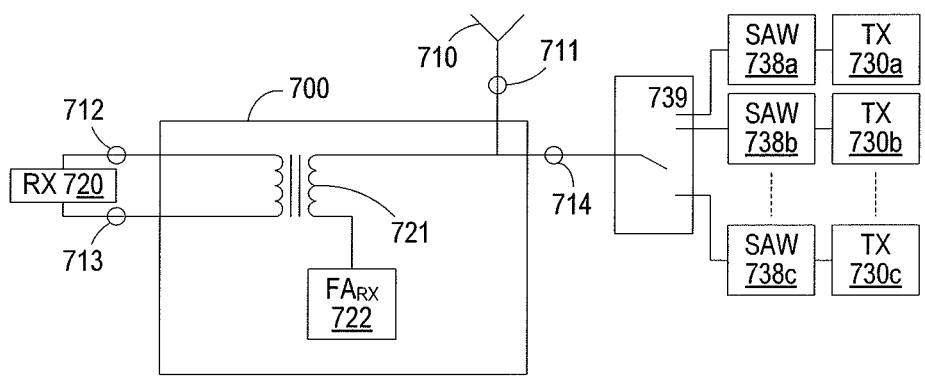

FIG. 7 illustrates an example of a transceiver arrangement according to some embodiments. The transceiver arrangement of FIG. 7 comprises a plurality of transmitters (TX) 730a-c typically serving different frequency bands, a receiver (RX) 720, an antenna 710 and a transceiver front-end 700. The antenna is connected to an antenna node 711 of the transceiver front-end, and the receiver is connected to two receiver nodes 712, 713 of the transceiver front-end. The transmitters are connected to a transmitter node 714 of the transceiver front-end via respective SAW filters 738a-c and an antenna switch 739.

The transceiver front-end 700 comprises a transmit frequency blocking arrangement.

The transmit frequency blocking arrangement comprises a transformer 721. In this example, the first and second sides of the transformer 721 have the same phase and no coupler is present.

The transmit frequency blocking arrangement also comprises a filter arrangement (FARX) 722 adapted to have a higher impedance value in a transmit frequency blocking interval (e.g., a frequency interval comprising the transmit frequency) than in a receive frequency non-blocking interval (e.g., a frequency interval comprising the receive frequency). The filter arrangement 722 may be a low pass filter arrangement if the receive frequency is lower than the transmit frequency and may be a high pass filter arrangement otherwise.

A first node of the first side of the transformer is connected to the antenna node, a first node of a second side of the transformer is connected to one of the receiver nodes and a second node of the second side of the transformer is connected to the other receiver node. The filter arrangement 722 is connected to the second node of the first side of the transformer.

The receive frequency blocking arrangement comprises the antenna switch 739 and the SAW-filters 738a-c.

Figure 8:
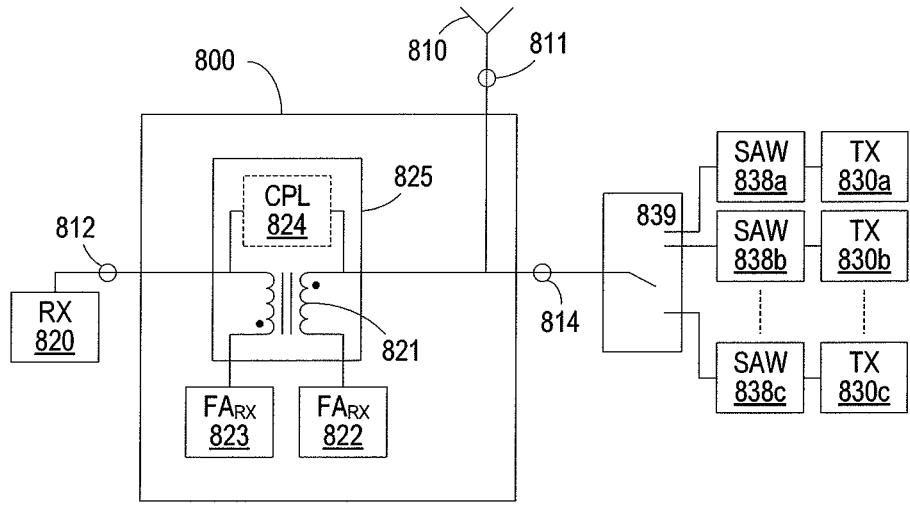

FIG. 8 illustrates an example of a transceiver arrangement according to some embodiments. The transceiver arrangement of FIG. 8 comprises a plurality of transmitters (TX) 830a-c typically serving different frequency bands, a receiver (RX) 820, an antenna 810 and a transceiver front-end 800. The antenna is connected to an antenna node 811 of the transceiver front-end, and the receiver is connected to a receiver node 812 of the transceiver front-end. The transmitters are connected to a transmitter node 814 of the transceiver front-end via respective SAW filters 838a-c and an antenna switch 839.

The transceiver front-end 800 comprises a transmit frequency blocking arrangement.

The transmit frequency blocking arrangement comprises a transformer 821. In this example, the first and second sides of the transformer 821 have the opposite phase and a coupler (CPL) 824 is optional.

The transmit frequency blocking arrangement also comprises two filter arrangements (FARX) 822, 823 adapted to have a higher impedance value in a transmit frequency blocking interval (e.g., a frequency interval comprising the transmit frequency) than in a receive frequency non-blocking interval (e.g., a frequency interval comprising the receive frequency).

A first node of the first side of the transformer is connected to the antenna node, and a first node of a second side of the transformer is connected to the receiver nodes. The filter arrangements 822 and 823 are respectively connected to the second node of the first and second sides of the transformer.

The receive frequency blocking arrangement comprises the antenna switch 839 and the SAW-filters 838a-c.

Figure 9:
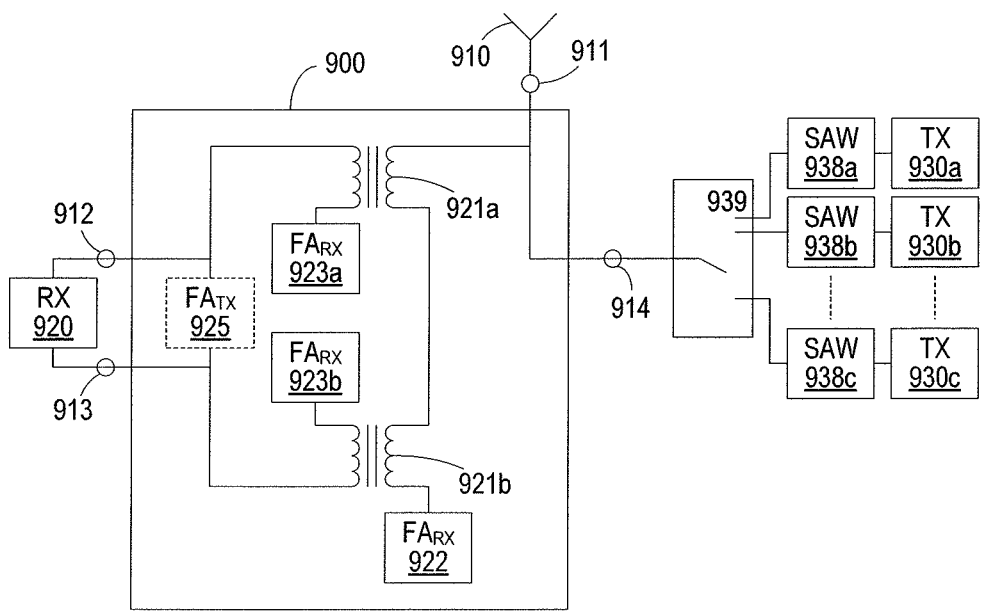

FIG. 9 illustrates an example of a transceiver arrangement according to some embodiments. The transceiver arrangement of FIG. 9 comprises a plurality of transmitters (TX) 930a-c typically serving different frequency bands, a receiver (RX) 920, an antenna 910 and a transceiver front-end 900. The antenna is connected to an antenna node 911 of the transceiver front-end, and the receiver is connected to a receiver node 912 of the transceiver front-end. The transmitters are connected to a transmitter node 914 of the transceiver front-end via respective SAW filters 938a-c and an antenna switch 939.

The transceiver front-end 900 comprises a transmit frequency blocking arrangement.

The transmit frequency blocking arrangement has a similar structure as the transmit frequency blocking arrangement of FIG. 6, and comprises first and second transformers 921a, 921b corresponding to 621a and 621b of FIG. 6, and filter arrangements 922, 923a, 923b and 925 corresponding respectively to 622, 623a, 623b and 625 of FIG. 6.

The receive frequency blocking arrangement comprises the antenna switch 939 and the SAW-filters 938a-c.

FIGS. 7-9 illustrate embodiments where a conventional solution is used for the receive frequency blocking arrangement. The transceiver front-ends 700, 800, 900 may be combined with any suitable known or future receive frequency blocking arrangement.

One advantage with the implementations of FIGS. 7-9 is that transmitter noise at receive frequency can be suppressed in the same order as with a conventional duplex filter, which may not be possible with the FA construction for all duplex distances and frequency bands.

Figure 10:
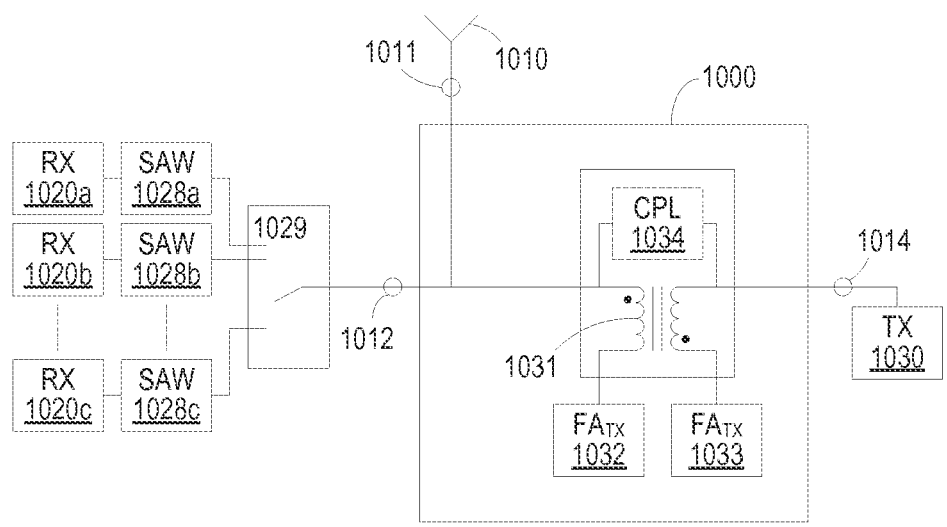

FIG. 10 illustrates an example of a transceiver arrangement according to some embodiments. The transceiver arrangement of FIG. 10 comprises a plurality of receivers (RX) 1020a-c typically serving different frequency bands, a transmitter (TX) 1030, an antenna 1010 and a transceiver front-end 1000. The antenna is connected to an antenna node 1011 of the transceiver front-end, and the transmitter is connected to a transmitter node 1014 of the transceiver front-end. The receivers are connected to a receiver node 1012 of the transceiver front-end via respective SAW filters 1028a-c and an antenna switch 1029.

The transceiver front-end 1000 comprises a receive frequency blocking arrangement.

The receive frequency blocking arrangement has a similar structure as the receive frequency blocking arrangement of FIG. 5, and comprises a transformer 1031 corresponding to 531 of FIG. 5, an optional coupler (CPL) 1034 corresponding to 534 of FIG. 5, and filter arrangements 1032 and 1033 corresponding respectively to 532 and 533 of FIG. 5.

The transmit frequency blocking arrangement comprises the antenna switch 1029 and the SAW-filters 1028a-c. Thus, FIG. 10 illustrates an embodiment where a conventional solution is used for the transmit frequency blocking arrangement. The transceiver front-end 1000 may be combined with any suitable known or future transmit frequency blocking arrangement.

One advantage with the implementation of FIG. 10 is that leakage towards the receiver at transmit frequency can be suppressed in the same order as with a conventional duplex filter, which may not be possible with the FA construction for all duplex distances and frequency bands.

The structures described herein for transmit frequency blocking arrangements may be equally applicable for receive frequency blocking arrangements (and vice versa).

Some embodiments comprise combinations of the examples illustrated in FIGS. 2 and 4-10. For example, the transmit frequency blocking arrangement of FIG. 6 may be combined with the receive frequency blocking arrangement of FIG. 5, etc.

In some embodiments, a transmit frequency blocking arrangement or a receive frequency blocking arrangement as described above may be combined with a receive frequency blocking arrangement or a transmit frequency blocking arrangement respectively, where the FA is replaced by a frequency translated impedance adapted to have a higher impedance value in the blocking frequency interval than in the non-blocking frequency interval.

The frequency translated impedance may comprise a frequency selective impedance, a clock signal provider adapted to provide a clock signal, and a mixer adapted to translate the frequency selective impedance by mixing it with the clock signal. The clock signal provider may be a clock signal source such as a clock signal generator, or the clock signal provider may be a clock signal input port of the frequency translated impedance. Thus, a clock signal generator may or may not be comprised in the frequency translated impedance. The mixer may comprise a single mixer or a set of mixers (e.g., an IQ-mixer—in-phase/quadrature mixer). In some embodiments, the clock signal may be a 4-phase IQ-signal and the mixer may be an IQ-mixer.

Figure 11:
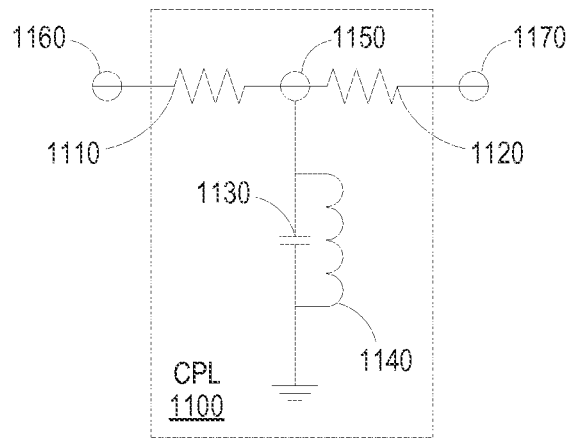
FIG. 11 is a schematic drawing illustrating an example coupler according to some embodiments.

FIG. 11 illustrates one example implementation of a coupler (see e.g., FIGS. 2, 5, 6, 8 and 10). A coupler may be appended between the windings of a transformer when the transformer sides are of opposite phase (i.e., the signal becomes differential over the coupler). For example, the coupler may be connected at a first node of the first side of the transformer and at a first node of the second side of the transformer.

The function of the coupler is to cancel any remaining signal at an unwanted frequency (e.g., transmit frequency for transmit frequency blocking arrangement and receive frequency for receive frequency blocking arrangement). Thus, any signal at the unwanted frequency that is still present over the transformer should be tracked and cancelled by feedback of a portion of the signal from the one side of the transformer to the other side of the transformer and by the transformer sides having opposite phase.

Typically, the fraction of the unwanted signal fed between the windings of the transformer should equal the fraction of the unwanted signal attenuated in the filter arrangement (i.e., amplitudes should be matched). Thus, adding the two signal paths (the one via the coupler and the one through the filter arrangement and transformer) the unwanted signal is cancelled. The optimization of this solution may be limited by the tuning capability of the circuit and by the bandwidth of the signal.

The example coupler (CPL) 1100 of FIG. 11 comprises first and second connection nodes 1160, 1170 and first and second resistances 1110, 1120 connected in series between the first and second connection nodes via a mid point node 1150. The first and second resistances may or may not be matched. The coupler 1100 also comprises a capacitance 1130 connected between the mid point node and ground and optionally an inductance 1140 connected in parallel with the capacitance. At least one of the components 1110, 1120, 1130 and 1140 are tunable to provide a possibility to achieve the optimum coupling as described above.

In some embodiments, the coupler comprises one or more resistances only. In some embodiments, the coupler comprises one or more resistances and only one of the capacitance 1130 and the inductance 1140 and in other embodiments the coupler comprises one or more resistances and both the capacitance 1130 and the inductance 1140.

If the filter arrangement(s) are attenuating the unwanted signal effectively, the component values of the coupler will typically be large compared to 50 ohm (to avoid degrading the desired signal).

As mentioned in connection with FIG. 4, the coupler function may also be achieved by a mutual inductance between the first inductances of a pair of filter arrangements. A structure with such a mutual inductance is illustrated in FIG. 4, and it may or may not be complemented by a coupler such as the one described in connection with FIG. 11.

Figure 12:
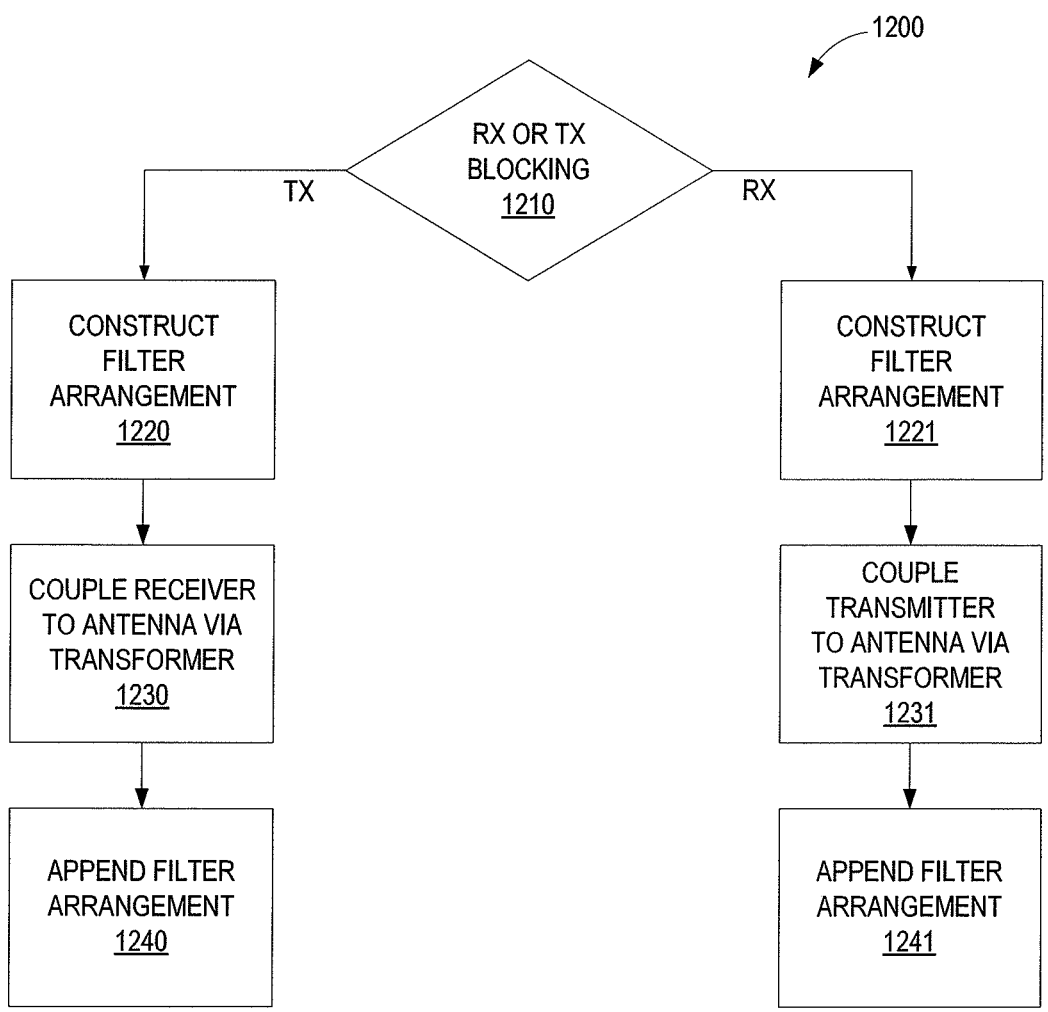
FIG. 12 is a flowchart illustrating example method steps according to some embodiments.

FIG. 12 illustrates an example method 1200 of blocking transmit and/or receive frequency signals according to some embodiments. The method starts in 1210, where it is determined whether it is transmit or receive frequency signals that are to be blocked.

If transmit frequency signals are to be blocked a suitable filter arrangement is constructed in 1220 based on transmit and receive frequencies. The construction in 1220 has been exemplified above in connection to e.g., FIGS. 3a, 3b, 5 and 6 and may typically be chosen to provide a FA with high impedance at transmit frequency and low impedance at receive frequency. In 1230, a signal transmission and reception arrangement (e.g., an antenna) is connected to a first node of a first side of a transformer and a receiver is connected to a first node of a second side of the transformer. The filter arrangement is connected to a second node of the first side of the transformer in 1240.

If receive frequency signals are to be blocked a suitable filter arrangement is constructed in 1221 based on transmit and receive frequencies. The construction in 1221 has been exemplified above in connection to e.g., FIGS. 3a, 3b, 5 and 6 and may typically be chosen to provide a FA with low impedance at transmit frequency and high impedance at receive frequency. In 1231, a signal transmission and reception arrangement (e.g., an antenna) is connected to a first node of a first side of a transformer and a transmitter is connected to a first node of a second side of the transformer. The filter arrangement is connected to a second node of the first side of the transformer in 1241.

Other details of the method may be extracted from the transceiver embodiments described above.

The described embodiments and their equivalents may be realized in hardware. They may be performed by specialized circuits such as for example application-specific integrated circuits (ASIC), by discrete components, or by a combination thereof. All such forms are contemplated to be within the scope of the invention.

The invention may be embodied within an electronic apparatus (such as a wireless or wired communication device) comprising circuitry/logic according to any of the embodiments. The electronic apparatus may, for example, be a portable or handheld mobile radio communication equipment, a mobile radio terminal, a mobile telephone, a base station, a communicator, an electronic organizer, a smartphone, a computer, a notebook, or a mobile gaming device.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

What is claimed is:

1. A transceiver front end for a communication device, said transceiver front end comprising:
    a frequency blocking arrangement connected to a signal transmission and reception node, and at least one of a receiver node and a transmitter node;
    said frequency blocking arrangement having a blocking frequency interval associated with one of a transmit frequency and a receive frequency, and a non-blocking frequency interval associated with the other one of the transmit frequency and receive frequency, and being configured to block passage of signals in said blocking frequency interval between said signal transmission and reception node and said receiver node or said transmitter node, wherein the blocking frequency interval is associated with the receive frequency and the first filter arrangement is configured to have a higher impedance value at the receive frequency than at the transmit frequency; and
    said frequency blocking arrangement comprising a network of passive components including at least one transformer and a filter arrangement configured to have a higher impedance value in the blocking frequency interval than in the non-blocking frequency interval;
    wherein the signal transmission and reception arrangement node is connected to a first node of a first side of the transformer of the frequency blocking arrangement;
    wherein the first filter arrangement of the frequency blocking arrangement is connected to a second node of the first side of the transformer of the frequency blocking arrangement; and
    wherein the transmitter node is connected to a first node of the second side of the transformer of the frequency blocking arrangement.

2. The transceiver front-end of claim 1 wherein the first filter arrangement comprises a first inductance connected in parallel with a first capacitance to form a blocking frequency resonance arrangement.

3. The transceiver front-end of claim 2 wherein the first filter arrangement further comprises at least one of a second inductance and a second capacitance connected in series with the blocking frequency resonance arrangement to form a non-blocking frequency resonance arrangement.

4. The transceiver front-end of claim 1 wherein the frequency blocking arrangement further comprises a second filter arrangement connected to a second node of the second side of the transformer of the frequency blocking arrangement.

5. The transceiver front-end of claim 1 wherein a second node of the second side of the transformer of the frequency blocking arrangement is connected to a second transmitter node.

6. The transceiver front-end of claim 1 wherein the network of passive components further comprises a coupler connected between the first node of the first side of the transformer and the first node of the second side of the transformer and is configured to cancel a remaining signal at the blocking frequency interval.

7. The transceiver front-end of claim 6 wherein the coupler comprises one or more resistances connected between the first node of the first side of the transformer and the first node of the second side of the transformer.

8. The transceiver front-end of claim 7 wherein the coupler comprises:
    first and second resistances connected in series between the first node of the first side of the transformer and the first node of the second side of the transformer via a mid point node; and
    a capacitance connected between the mid point node and ground.

9. The transceiver front-end of claim 8 wherein the coupler further comprises an inductance connected in parallel with the third capacitance.

10. The transceiver front-end of claim 9, wherein the first side of the transformer is configured to have an opposite phase compared to the second side of the transformer.

11. The transceiver front-end of claim 1 wherein the transmit frequency blocking arrangement comprises first and second transformers, and first, second, and third filter arrangements, and wherein:
    the signal transmission and reception arrangement node is connected to a first node of a first side of the first transformer;
    the receiver node is connected to a first node of a second side of the first transformer;
    a second node of the first side of the first transformer is connected to a first node of a first side of the second transformer;
    a second node of the first side of the second transformer is connected to the first filter arrangement;
    a second node of the second side of the first transformer is connected to a second filter arrangement;
    a first node of a second side of the second transformer is connected to a third filter arrangement; and
    a second node of the second side of the second transformer is connected to a second node of the one or more receiver nodes.

12. A transceiver including a transmitter, a receiver, and a transceiver front end, said transceiver front end comprising:
a frequency blocking arrangement connected to a signal transmission and reception node, and at least one of a receiver node and a transmitter node; and
a signal transmission and reception arrangement;
said frequency blocking arrangement having a blocking frequency interval associated with one of a transmit frequency and a receive frequency, and a non-blocking frequency interval associated with the other one of the transmit frequency and receive frequency, and being configured to block passage of signal in said blocking frequency interval between said signal transmission and reception node and said receiver node or said transmitter node; and
said frequency blocking arrangement comprising a network of passive components including at least one transformer and a filter arrangement configured to have a higher impedance value in the blocking frequency interval than in the non-blocking frequency interval.

13. A communication device comprising a transceiver including a transmitter, a receiver, and a transceiver front end, said transceiver front end comprising:
a frequency blocking arrangement connected to a signal transmission and reception node, and at least one of a receiver node and a transmitter node; and
a signal transmission and reception arrangement;
said frequency blocking arrangement having a blocking frequency interval associated with one of a transmit frequency and a receive frequency, and a non-blocking frequency interval associated with the other one of the transmit frequency and receive frequency, and being configured to block passage of signal in said blocking frequency interval between said signal transmission and reception node and said receiver node or said transmitter node; and
said frequency blocking arrangement comprising a network of passive components including at least one transformer and a filter arrangement configured to have a higher impedance value in the blocking frequency interval than in the non-blocking frequency interval.

14. A communication device comprising a transceiver front end, said transceiver front end comprising:
a frequency blocking arrangement connected to a signal transmission and reception node, and at least one of a receiver node and a transmitter node;
said frequency blocking arrangement having a blocking frequency interval associated with one of a transmit frequency and a receive frequency, and a non-blocking frequency interval associated with the other one of the transmit frequency and receive frequency, and being configured to block passage of signals in said blocking frequency interval between said signal transmission and reception node and said receiver node or said transmitter node, wherein the blocking frequency interval is associated with the receive frequency and the first filter arrangement is configured to have a higher impedance value at the receive frequency than at the transmit frequency; and
said frequency blocking arrangement comprising a network of passive components including at least one transformer and a filter arrangement configured to have a higher impedance value in the blocking frequency interval than in the non-blocking frequency interval;
wherein the signal transmission and reception arrangement node is connected to a first node of a first side of the transformer of the frequency blocking arrangement;
wherein the first filter arrangement of the frequency blocking arrangement is connected to a second node of the first side of the transformer of the frequency blocking arrangement; and
wherein the transmitter node is connected to a first node of the second side of the transformer of the frequency blocking arrangement.

15. The communication device of claim 14 wherein the first filter arrangement comprises a first inductance connected in parallel with a first capacitance to form a blocking frequency resonance arrangement.

16. The communication device of claim 15 wherein the first filter arrangement further comprises at least one of a second inductance and a second capacitance connected in series with the blocking frequency resonance arrangement to form a non-blocking frequency resonance arrangement.

17. The communication device of claim 14 wherein the frequency blocking arrangement further comprises a second filter arrangement connected to a second node of the second side of the transformer of the frequency blocking arrangement.

18. The communication device of claim 14 wherein a second node of the second side of the transformer of the frequency blocking arrangement is connected to a second transmitter node.

19. The communication device of claim 14 wherein the network of passive components further comprises a coupler connected between the first node of the first side of the transformer and the first node of the second side of the transformer and is configured to cancel a remaining signal at the blocking frequency interval.

20. The communication device of claim 19 wherein the coupler comprises one or more resistances connected between the first node of the first side of the transformer and the first node of the second side of the transformer.

21. The communication device of claim 20 wherein the coupler comprises:
first and second resistances connected in series between the first node of the first side of the transformer and the first node of the second side of the transformer via a mid point node; and
a capacitance connected between the mid point node and ground.

22. The communication device of claim 21 wherein the coupler further comprises an inductance connected in parallel with the third capacitance.

23. The communication device of claim 22 wherein the first side of the transformer is configured to have an opposite phase compared to the second side of the transformer.

24. The communication device of claim 14 wherein the transmit frequency blocking arrangement comprises first and second transformers, and first, second, and third filter arrangements, and wherein:
the signal transmission and reception arrangement node is connected to a first node of a first side of the first transformer;
the receiver node is connected to a first node of a second side of the first transformer;
a second node of the first side of the first transformer is connected to a first node of a first side of the second transformer;
a second node of the first side of the second transformer is connected to the first filter arrangement;
a second node of the second side of the first transformer is connected to a second filter arrangement;
a first node of a second side of the second transformer is connected to a third filter arrangement; and a second node of the second side of the second transformer is connected to a second node of the one or more receiver nodes.

25. A transceiver front end for a communication device, said transceiver front end comprising:
a frequency blocking arrangement connected to a signal transmission and reception node, and at least one of a receiver node and a transmitter node;
said frequency blocking arrangement having a blocking frequency interval associated with one of a transmit frequency and a receive frequency, and a non-blocking frequency interval associated with the other one of the transmit frequency and receive frequency, and being configured to block passage of signals in said blocking frequency interval between said signal transmission and reception node and said receiver node or said transmitter node, wherein the blocking frequency interval is associated with a transmit frequency and the first filter arrangement is configured to have a higher impedance value at the transmit frequency than at the receive frequency; and
said frequency blocking arrangement comprising a network of passive components including at least one transformer and a filter arrangement configured to have a higher impedance value in the blocking frequency interval than in the non-blocking frequency interval;
wherein the signal transmission and reception arrangement node is connected to a first node of a first side of the transformer of the frequency blocking arrangement,
wherein the first filter arrangement of the frequency blocking arrangement is connected to a second node of the first side of the transformer of the frequency blocking arrangement,
wherein the receiver node is connected to a first node of the second side of the transformer of the transmit frequency blocking arrangement; and
wherein the frequency blocking arrangement further comprises a second filter arrangement connected to a second node of the second side of the transformer of the frequency blocking arrangement.

26. The transceiver front-end of claim 25 wherein a second node of the second side of the transformer of the frequency blocking arrangement is connected to a second receiver node.

27. The transceiver front-end of claim 25 wherein the first filter arrangement comprises a first inductance connected in parallel with a first capacitance to form a blocking frequency resonance arrangement.

28. The transceiver front-end of claim 27 wherein the first filter arrangement further comprises at least one of a second inductance and a second capacitance connected in series with the blocking frequency resonance arrangement to form a non-blocking frequency resonance arrangement.

29. The transceiver front-end of claim 25 wherein the network of passive components further comprises a coupler connected between the first node of the first side of the transformer and the first node of the second side of the transformer and is configured to cancel a remaining signal at the blocking frequency interval.

30. The transceiver front-end of claim 29 wherein the coupler comprises one or more resistances connected between the first node of the first side of the transformer and the first node of the second side of the transformer.

31. The transceiver front-end of claim 30 wherein the coupler comprises:
first and second resistances connected in series between the first node of the first side of the transformer and the first node of the second side of the transformer via a mid point node; and
a capacitance connected between the mid point node and ground.

32. The transceiver front-end of claim 31 wherein the coupler further comprises an inductance connected in parallel with the third capacitance.

33. The transceiver front-end of claim 32, wherein the first side of the transformer is configured to have an opposite phase compared to the second side of the transformer.

34. The transceiver front-end of claim 25 wherein the transmit frequency blocking arrangement comprises first and second transformers, and first, second, and third filter arrangements, and wherein:
the signal transmission and reception arrangement node is connected to a first node of a first side of the first transformer;
the receiver node is connected to a first node of a second side of the first transformer;
a second node of the first side of the first transformer is connected to a first node of a first side of the second transformer;
a second node of the first side of the second transformer is connected to the first filter arrangement;
a second node of the second side of the first transformer is connected to a second filter arrangement;
a first node of a second side of the second transformer is connected to a third filter arrangement; and
a second node of the second side of the second transformer is connected to a second node of the one or more receiver nodes.

35. A communication device comprising a transceiver front end, said transceiver front end comprising:
a frequency blocking arrangement connected to a signal transmission and reception node, and at least one of a receiver node and a transmitter node;
said frequency blocking arrangement having a blocking frequency interval associated with one of a transmit frequency and a receive frequency, and a non-blocking frequency interval associated with the other one of the transmit frequency and receive frequency, and being configured to block passage of signals in said blocking frequency interval between said signal transmission and reception node and said receiver node or said transmitter node, wherein the blocking frequency interval is associated with a transmit frequency and the first filter arrangement is configured to have a higher impedance value at the transmit frequency than at the receive frequency; and
said frequency blocking arrangement comprising a network of passive components including at least one transformer and a filter arrangement configured to have a higher impedance value in the blocking frequency interval than in the non-blocking frequency interval;
wherein the signal transmission and reception arrangement node is connected to a first node of a first side of the transformer of the frequency blocking arrangement,
wherein the first filter arrangement of the frequency blocking arrangement is connected to a second node of the first side of the transformer of the frequency blocking arrangement,
wherein the receiver node is connected to a first node of the second side of the transformer of the transmit frequency blocking arrangement; and
wherein the frequency blocking arrangement further comprises a second filter arrangement connected to a second node of the second side of the transformer of the frequency blocking arrangement.

36. The communication device of claim 35 wherein a second node of the second side of the transformer of the frequency blocking arrangement is connected to a second receiver node.

37. The communication device of claim 35 wherein the first filter arrangement comprises a first inductance connected in parallel with a first capacitance to form a blocking frequency resonance arrangement.

38. The communication device of claim 37 wherein the first filter arrangement further comprises at least one of a second inductance and a second capacitance connected in series with the blocking frequency resonance arrangement to form a non-blocking frequency resonance arrangement.

39. The communication device of claim 38 wherein the network of passive components further comprises a coupler connected between the first node of the first side of the transformer and the first node of the second side of the transformer and is configured to cancel a remaining signal at the blocking frequency interval.

40. The communication device of claim 39 wherein the coupler comprises one or more resistances connected between the first node of the first side of the transformer and the first node of the second side of the transformer.

41. The communication device of claim 40 wherein the coupler comprises:
first and second resistances connected in series between the first node of the first side of the transformer and the first node of the second side of the transformer via a mid point node; and
a capacitance connected between the mid point node and ground.

42. The communication device of claim 41 wherein the coupler further comprises an inductance connected in parallel with the third capacitance.

43. The communication device of claim 42, wherein the first side of the transformer is configured to have an opposite phase compared to the second side of the transformer.

44. The communication device of claim 35 wherein the transmit frequency blocking arrangement comprises first and second transformers, and first, second, and third filter arrangements, and wherein:
the signal transmission and reception arrangement node is connected to a first node of a first side of the first transformer;
the receiver node is connected to a first node of a second side of the first transformer;
a second node of the first side of the first transformer is connected to a first node of a first side of the second transformer;
a second node of the first side of the second transformer is connected to the first filter arrangement;
a second node of the second side of the first transformer is connected to a second filter arrangement;
a first node of a second side of the second transformer is connected to a third filter arrangement; and
a second node of the second side of the second transformer is connected to a second node of the one or more receiver nodes.

45. A communication device configured to block receive frequency signals from passage between a signal transmission and reception arrangement and a transmitter of the communication device, the communication device comprising:
a filter arrangement comprising a first inductance connected in parallel with a first capacitance to form a blocking frequency resonance arrangement, and at least one of a second inductance and a second capacitance connected in series with the blocking frequency resonance arrangement to form a non-blocking frequency resonance arrangement, wherein the filter arrangement has a higher impedance value at the receive frequency than at the transmit frequency;
wherein the signal transmission and reception arrangement is connected to a first node of a first side of a transformer and the transmitter is connected to a first node of a second side of the transformer; and
wherein the filter arrangement is connected to a second node of the first side of the transformer.

* * * * *